(12) United States Patent  
Feichtinger et al.

(10) Patent No.: US 8,932,404 B2
(45) Date of Patent: Jan. 13, 2015

(54) METHOD AND DEVICE FOR PRODUCING SEMICRYSTALLINE POLYMER MATERIAL

(75) Inventors: Klaus Feichtinger, Linz (AT); Manfred Hackl, Linz-Urfahr (AT); Andreas Roessler-Czermak, Neuhofen an der Krems (AT); Gerald Weis, Aschaffenburg (DE)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 109 days.

(21) Appl. No.: 13/320,010

(22) PCT Filed: Dec. 27, 2010

(86) PCT No.: PCT/AT2010/000494
§ 371 (c)(1),
(2), (4) Date: Feb. 28, 2012

(87) PCT Pub. No.: WO2011/079342
PCT Pub. Date: Jul. 7, 2011

(65) Prior Publication Data
US 2012/0165497 A1 Jun. 28, 2012

(30) Foreign Application Priority Data
Dec. 28, 2009 (AT) ................................ A 2043/2009

(51) Int. Cl.
*C30B 7/08* (2006.01)
*B01J 8/00* (2006.01)
(52) U.S. Cl.
CPC *C08J 63/88* (2013.01); *B01J 8/003* (2013.01); *B01J 2208/00752* (2013.01)
USPC ................ 117/200; 117/201; 117/68; 117/70

(58) Field of Classification Search
USPC ..................................... 117/200, 201, 68, 70
See application file for complete search history.

(56) References Cited

U.S. PATENT DOCUMENTS 4,158,738 A * 6/1979 Scott et al. ..................... 562/416
H1510 H * 12/1995 Collignon et al. ............ 564/242

FOREIGN PATENT DOCUMENTS

EP 0 597 155 A1 5/1994
JP 2007-023153 A 2/2007

* cited by examiner

*Primary Examiner* — Bob M Kunemund
(74) *Attorney, Agent, or Firm* — Kilpatrick Townsend & Stockton LLP

(57) ABSTRACT

The present invention relates to a method for producing semicrystalline polymer material, wherein the predominantly amorphous raw polymer material, in particular granules, to be treated is introduced into a crystallization reactor (1) and is partially crystallized there by being heated, but without melting, and subsequently the semicrystalline polymer material obtained in such a way is removed from the crystallization reactor (1) and at least part of said semicrystalline polymer material is diverted and mixed back into the crystallization reactor (1) in order to reduce the adhesive tendency of the polymer material. According to the invention, the diverted semicrystalline polymer material is combined and mixed with the raw polymer material before being mixed back into the crystallization reactor (1), and the mixture is then introduced into the crystallization reactor (1).

14 Claims, 4 Drawing Sheets

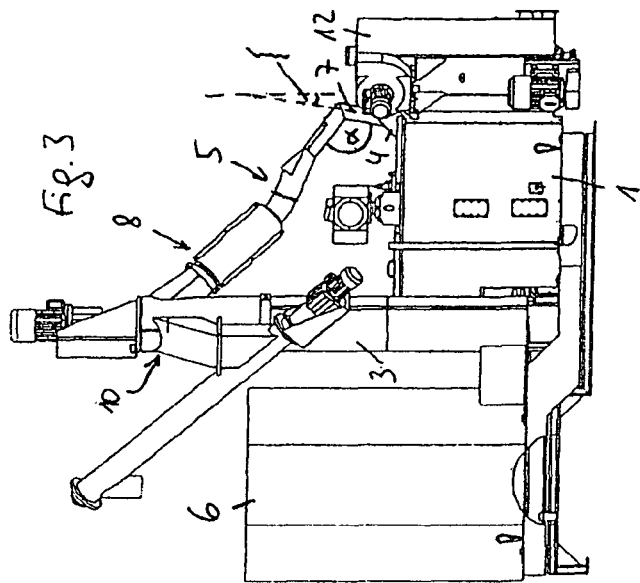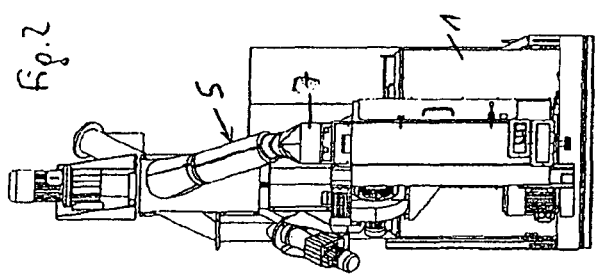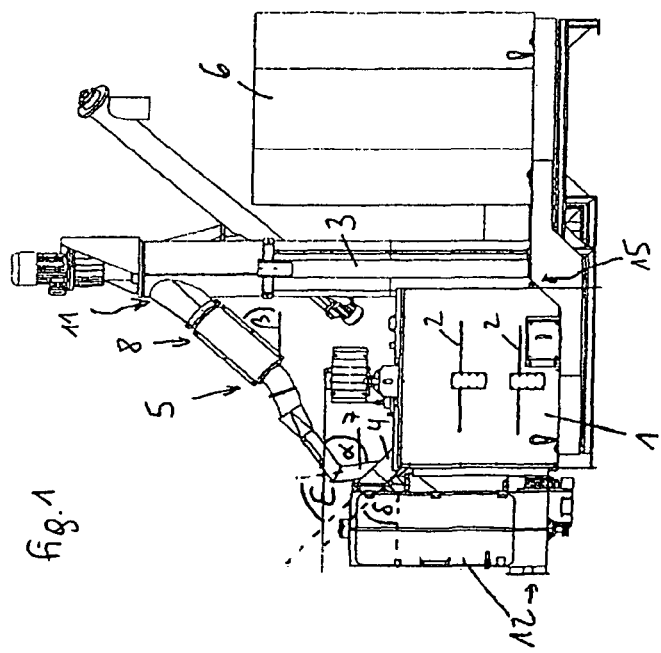

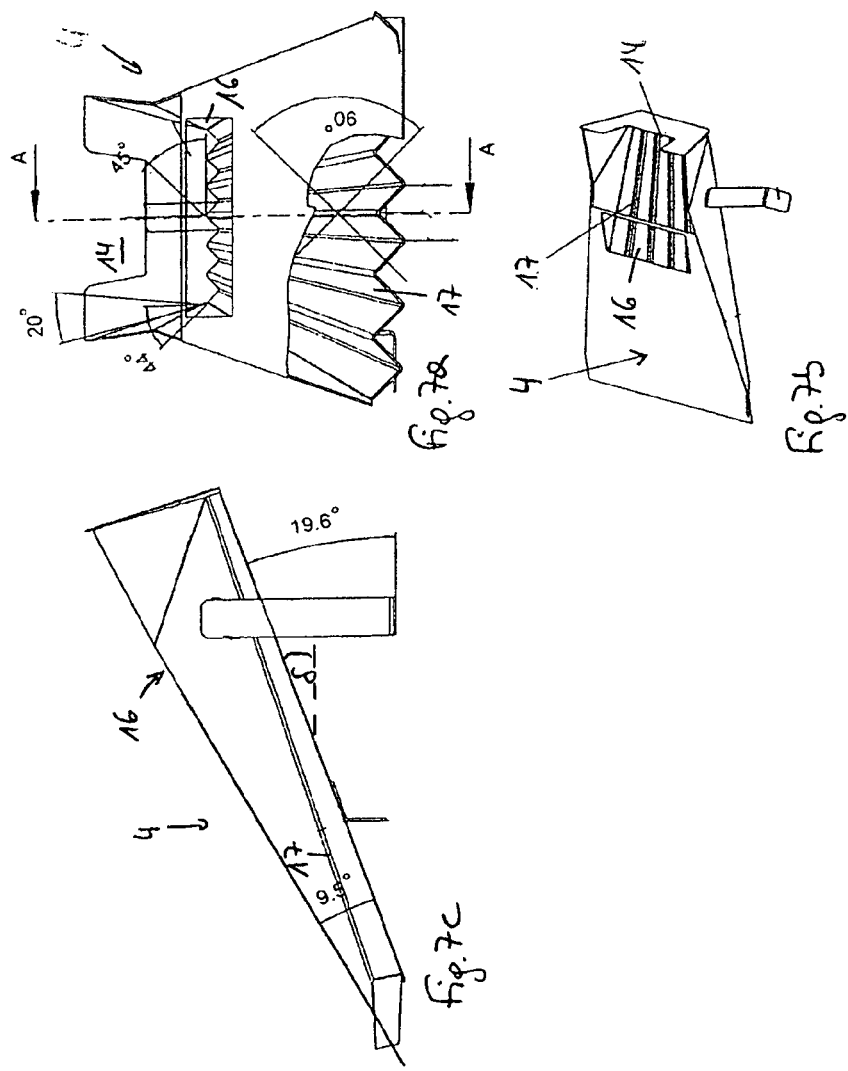

METHOD AND DEVICE FOR PRODUCING SEMICRYSTALLINE POLYMER MATERIAL

CROSS-REFERENCES TO RELATED APPLICATIONS

Figure 5:
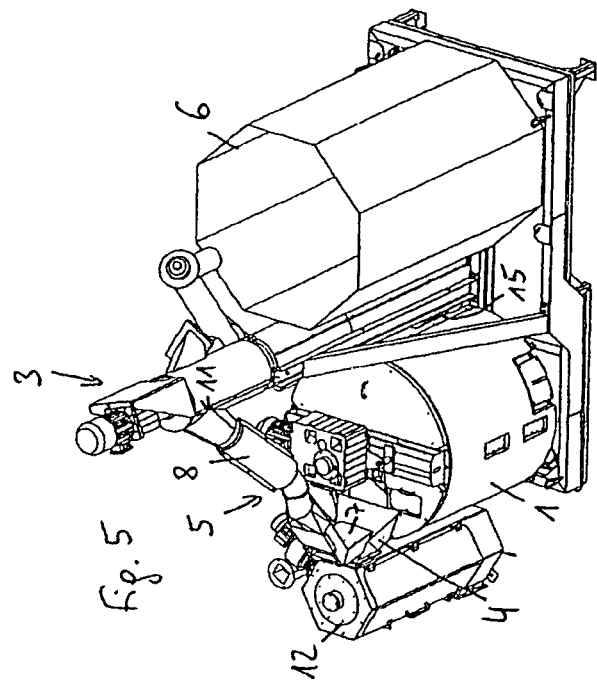

This application is a National Stage of International Application No. PCT/AT2010/000494 filed Dec. 27, 2010, and which claims the benefit of Austrian Patent Application No. A2043/2009, filed Dec. 28, 2009, the disclosures of which are incorporated herein by reference.

The invention concerns a procedure for producing partially crystalline or semi-crystalline polymer material according to the generic part of claim 1, and an apparatus for performing the procedure according to the generic part of claim 6.

Numerous versions of procedures for crystallizing polymers are known and are used primarily to facilitate the storage, transportation, treatment or further processing of polymers, and to influence the properties of these polymers.

During the crystallization of thermoplastic polymers, there is a partial alignment of molecular chains in the polymer. Starting from the crystal nuclei, the molecular chains fold together and initially form lamellar structures which then form larger structures such as spherulites.

Crystallization depends on various parameters such as the temperature during crystallization, the molecular weight of the polymer, the type of polymer, but also on moisture, solvents, the pressure or the presence of fillers in the polymer.

Crystallization or the degree of crystallization has a considerable effect on the optical, mechanical, thermal and chemical properties of the polymer. In particular, it is an important concern to reduce the tendency of amorphous polymers, which usually occur in granular form, to stick or lump together, by increasing the degree of crystallization. In that manner, particularly the processing, transportation and storage of the granules can be considerably simplified.

To reduce the stickiness of thermoplastic polymers such as polyethylene terephthalate (PET) during the crystallization process, numerous procedures are known from prior art.

Thus, U.S. Pat. No. 3,746,688 describes drying the amorphous granules for several hours prior to the crystallization process. U.S. Pat. No. 3,014,011 describes the reduction of stickiness through prior treatment of the granules with a swelling agent. U.S. Pat. No. 5,919,872 describes the use of coating agents for reducing the tendency to lump together. In EP 1 203 040 or U.S. Pat. No. 3,544,525, the granules are held and tempered at a certain temperature below the melting point.

It is also known from prior art to add a certain proportion of already partially crystallized granules to the amorphous crude granules in the crystallization reactor, which have a tendency to lump together, to maintain the flowability of the particles in the crystallization reactor. This is achieved when the non-sticky partially crystallized granules are intermixed with the amorphous granules, causing the total granulate to remain particulate and not to lump together, even at higher temperatures.

However, all these above named procedures have some disadvantages. In particular, it is not always advantageous to use coating agents, swelling agents or such, and the prior treatment of the raw material, for example, leads to a longer processing time and to increased costs.

In particular, the re-mixing of the partially crystallized material from the amorphous crude granules is a rather critical process, since in the re-mixing directly into the crystallization reactor—as this is presently customary in prior art—thorough mixing is not ensured and cannot be accomplished, and lumps of sticky amorphous granules are formed in at least some areas of the reactor.

It is therefore the object of the present invention to further develop a procedure of the aforementioned kind such that thorough mixing of the predominantly amorphous granules with the partially crystalline or semi-crystalline granules can be achieved without the mutual conglutination of the granules.

It is furthermore the object of the invention to create an apparatus for performing this procedure.

For the procedure, the object is achieved by the characterizing part of claim 1. It is provided that prior to its re-mixing, the separated partially crystalline or semi-crystalline polymer material is brought into the crystallization container together with the untreated, mostly amorphous raw polymer material which tends to lump together, and that the mixture is only subsequently conveyed into the crystallization reactor.

This procedure has the advantage that intensive mixing can already take place before the material enters the crystallization reactor, and the possibility of lumping together is already prevented in a state prior to the crystallization reactor. The formation of sticky lumps is thus made impossible, since the mixture that enters the crystallization reactor already has lost its tendency to lump together. This allows the permanent maintenance of the particles' flowability, and crystallization can take place effectively and homogeneously.

Furthermore, in this manner, the required volume of the re-mixed partially crystalline or semi-crystalline polymer is reduced, since that is more effective. Due to the re-mixing ratio, the necessary dwell time in the reactor is shortened, and thus also the size and the energy requirement of the necessary crystallization arrangement.

In an apparatus of the aforementioned type, the problem is solved in that the transfer section ends in the add-on socket.

The aforementioned advantages are achieved in a simple manner because it is provided that the admixture is not added directly into the crystallization reactor, but that pre-mixing takes place upstream in the add-on socket.

The add-on socket ends in the crystallization container above the material level. The transfer section connects to the crystallization container in a section below the material level.

The term "amorphous crude granulate" is not only defined exclusively or up to 100% amorphous granules without any crystallization components, but a granulate which persons skilled in the art would classify as primarily amorphous or as too amorphous to meet the desired requirements.

The following sub-claims describe advantageous developments and embodiments of the procedure and the apparatus:

According to an advantageous embodiment of the procedure, it is provided that the combination and mixing together of separated partially crystalline or semi-crystalline polymer material and raw polymer material is accomplished in a region outside the crystallization reactor, in particular in an add-on socket. In this manner, effective mixing is achieved, and the risk of lumping together is effectively reduced.

According to another version of the procedure, it is advantageous if the partially crystalline or semi-crystalline polymer material removed from the crystallization reactor is moved to a level above the crystallization reactor, especially via a vertical auger, and the separated partially crystalline or semi-crystalline polymer material subsequently slides through gravity via a material chute to the add-on section for re-mixing. In that manner, through the effect of gravity, the potential energy of the granules can be easily converted into kinetic energy, and the granules easily achieve a certain flow velocity which is an advantage for subsequent good admixture.

In this connection, it is advantageous when the separated partially crystalline or semi-crystalline polymer material as well as the raw polymer material are flowing at a certain flow velocity at the place and time of their meeting together, whereby the flow directions of the two material streams meet particularly at an acute angle, preferably at an angle between 20° and 55°, and in particular between 30° and 40°. When the two material streams are in motion, there is an even smaller risk that the particles stick together, and the kinetic energy of the particles is utilized for thorough mixing.

It is furthermore advantageous if attention is paid that the separated partially crystalline or semi-crystalline polymer material as well as the raw polymer material is permanently and in every section of the process held particulate and flowable. This facilitates handling and processing of the granulate.

According to an advantageous version of the procedure, the polymer is heated in the crystallization reactor without the addition of external heating energy or fuels. Advantageously the heat necessary for successful and quick crystallization comes exclusively from the internal energy of the granules and/or it is generated during exothermal crystallization.

An advantageous embodiment of the apparatus results when it is provided that the transfer section comprises a conveying means, especially one directly connected to the crystallization reactor, preferably a vertical auger, with which the partially crystalline or semi-crystalline polymer material exiting from the crystallization reactor can be conveyed to a level above the crystallization reactor. It is furthermore advantageous when the transfer sector comprises a material chute preferably formed as a tube which, beginning from an upper section of the conveying means, ends diagonally in the add-on socket, whereby the material chute is preferably at an incline angle β toward the horizontal, between 15° and 50°, especially between 20° and 30°. This allows the material to be re-mixed to slide downward from a certain height under the force of gravity and to be mixed with the raw polymer at a faster velocity without additional conveying means. To prevent plugging and to ensure a certain minimum velocity, the aforesaid incline angle β is advantageous.

Due to the fact that the add-on socket is arranged in an upper edge region of the crystallization reactor, and/or is inclined downwards, especially at an angle δ between 25° and 60°, particularly between 30° and 40° to the horizontal, which allows the polymer material to slide into the crystallization reactor, the mainly amorphous crude granules also attain a certain velocity and slide into the crystallization reactor.

An extremely advantageous embodiment results when the material chute comprises an upper section close to the conveying means and a lower end section or buckled section close to the add-on socket, whereby the buckled section stands at an angle to the add-on socket or downward, with the angle α between the upper section of the material chute and the buckled section is in particular between 60° and 140°, preferably between 90° and 100°. The buckled section acts as a baffle plate. The partially crystalline or semi-crystalline polymers hit the opposite wall of the buckled section at a higher velocity, which swirls them around. This results in better distribution and a variety of motional directions and velocities of the individual particles, thus preventing the two material streams in the add-on socket from forming layers.

To prevent plugging, it is advantageous when it is provided that the middle axis of the add-on socket forms an acute angle ε with the middle axis of the buckled section, preferably between 20° and 55°, in particular between 30° and 40°. Thus, the material streams meet each other under substantially similar directional vectors, but still without forming layers in the add-on socket.

According to an advantageous embodiment, the middle axis of the buckled section is almost vertically aligned, especially at an angle ζ to the vertical between 0° and 45°, preferably between 15° and 25°. In this way, the baffled granules drop into the add-on socket almost in free fall.

An advantageous apparatus is provided when the middle axis of the buckled section and the middle axis of the add-on socket define or span a plane that divides the crystallization reactor into two substantially equal subsections, and lets the conveying means or the middle axis of the vertical auger come to lie in that plane.

Alternatively it can be provided that the upper section of the material chute is aligned opposite to the plane at an angle γ, in particular between 10° and 30° and/or that the conveying means or the middle axle of the vertical auger lies outside the plane. Thanks to the space-saving off-centre arrangement of the vertical auger, and to the buckled design (in top view) of the material chute, an additional impulse can be provided to the particles to be re-mixed.

To achieve a thorough mixing, it is advantageously possible for the material chute to increase in width prior to the buckled section and perhaps also to change its cross-sectional shape.

Advantageously, the thorough mixing and even feeding of the already mixed granules is accomplished when the add-on socket broadens in the shape of a fan in its end section close to the crystallization reactor. This leads to a better distribution of the granules in the crystallization reactor.

In that connection, it is advantageous when it is provided that a number of straight recessed grooves are formed in the lower sliding surface of the add-on socket. The raw polymer material which enters above the add-on opening as well as the partially crystalline or semi-crystalline material coming from above slides in these grooves and is distributed evenly over the entire width of the add-on socket, resulting in thorough mixing and allowing a wide, relatively thin and accordingly slightly homogenously admixable and mixable material stream to enter the crystallization reactor.

When the material flows in the grooves, it is no longer critical if the add-on socket is inclined transverse to the longitudinal direction, for example due to imprecise installation. Otherwise the material would collect on the side of the socket, mix poorly and enter the crystallization reactor as a thick material stream that would be difficult to incorporate.

Preferably, the height or depth and/or the width of the grooves increases downstream in flow direction, resulting in additional equalization and homogenization of the material.

According to an advantageous embodiment, it is provided that the vertical auger has an additional discharge opening for discharging the material, whereby the discharge opening lies lower than or as a maximum at the same level as the opening to which the material chute is connected.

In this connection, it is advantageous when a control device is provided with which that portion of the partially crystalline or semi-crystalline polymer material that is branched off into the material chute and/or that portion of the partially crystalline or semi-crystalline polymer material that is discharged over the discharge opening can be adjusted. This can allow for the easy and effective control of the re-mixing ratio. Alternatively, the partially crystalline or semi-crystalline material can also be branched off through a separate discharge directly from the crystallization reactor.

Furthermore, a bin for capturing and storing and/or a container for further processing the partially crystalline or semicrystalline polymer material, such as an SSP bin, can be connected to the conveying means of the discharge opening.

Preferably, the connection is made via an auger with which the volume of the partially crystalline granules to be discharged can be controlled.

According to an advantageous embodiment, it is provided that upstream of the crystallization reactor and the add-on socket, a centrifuge is provided to separate surface moisture and any fines, and that with the centrifuge the crude polymer material is fed at increased speed, preferably tangentially, into the add-on socket. In that manner, the amorphous crude granules entering the add-on socket retain their speed pulse which they receive in the centrifuge. This speed pulse is used subsequently for the admixture and to assure thorough mixing.

Further advantages and embodiments of the invention are implied in the Description and shown in the enclosed drawings.

Figure 4:
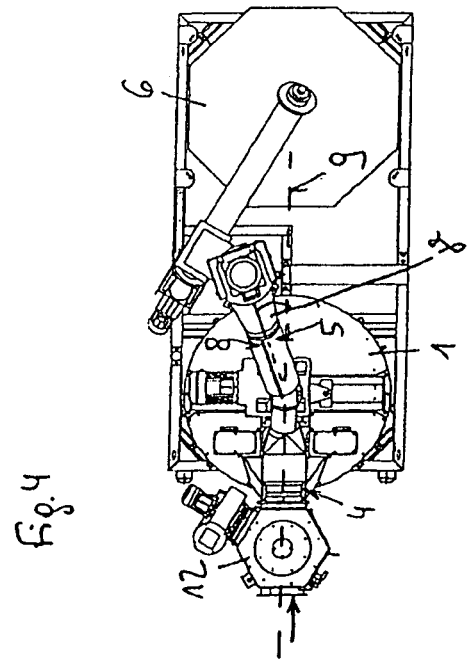
Figure 6B:
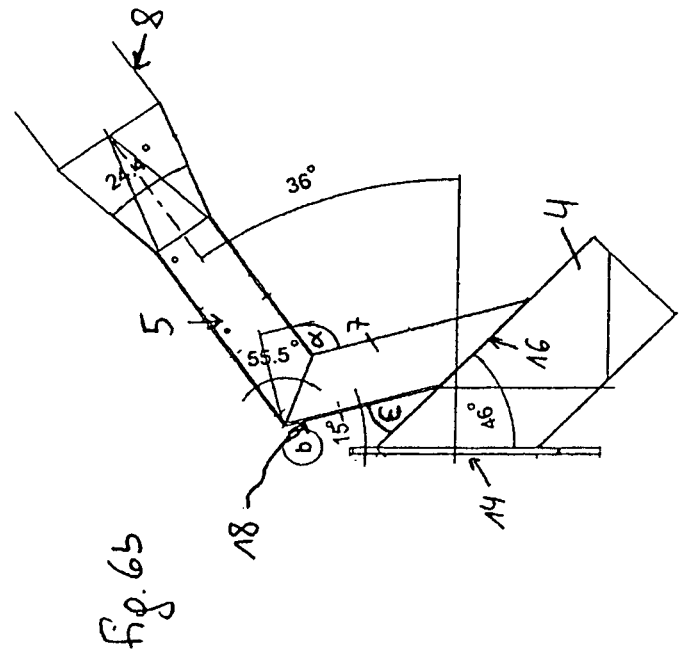
Figure 6A:
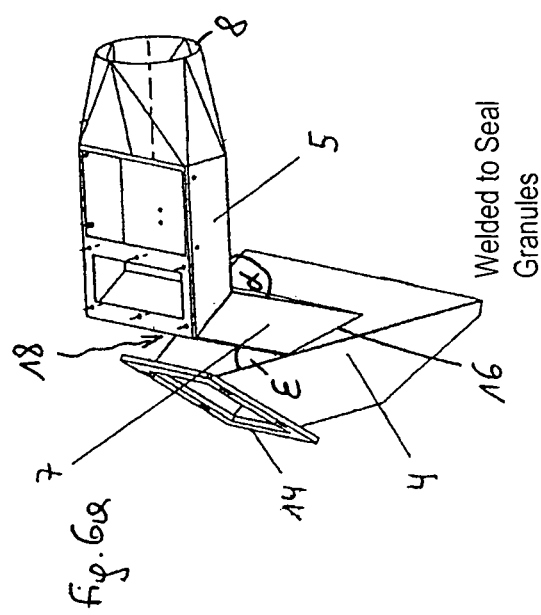

The invention is described in detail by means of embodiments and with reference to the following drawings, where FIG. 1 shows a lateral view of the inventive apparatus, FIG. 2 shows a frontal view of the apparatus according to FIG. 1, FIG. 3 shows the apparatus from the other side, FIG. 4 shows a top view of the apparatus, FIG. 5 shows a diagonal view from the top, FIG. 6a and 6b show the section of an advantageous add-on socket in detail.

FIG. 7a, b and c show details of an advantageous add-on socket.

FIG. 1 shows a lateral view of an example of a particularly advantageous embodiment of the inventive apparatus. At bottom left is a crystallization reactor 1 which is designed in a conventional manner with a cylindrical bin with a horizontal bottom and vertical side walls. In the interior of the crystallization reactor 1 is a mixer/agitator 2. In the present case, the latter is arranged on two levels above each other. The mixer/agitator 2 comprises rotating blades or bars which turn in a horizontal plane parallel to the bottom and which are arranged on a common vertical drive shaft. These blades or bars permanently move, mix and keep the polymer material in the crystallization reactor 1 in flowable, particulate form.

The crystallization reactor 1 may include means to heat and/or cool the polymer material. Heating can be provided from the outside via jacket heating or internally via heated mixing and agitating tools 2. However, the granules substantially still possess sufficient internal energy and heat, so that no additional heating is necessary. Furthermore, the crystallization process is exothermal, which may even require cooling in order to prevent the partial melting of the granules.

For effective crystallization, the temperature of the granules has to be permanently held above the glass transition temperature and below the melting point. For PET, the optimal crystallization rate lies at a temperature of about 174° C.

In the top left margin of the crystallization reactor 1, an add-on socket 4 is added through which the material is introduced into the crystallization reactor 1. During operation, the add-on socket 4 lies in the region above the material level of the moved particles. The add-on socket 4 is inclined downward at an angle $\delta$ of about 30° to 40° which allows the polymer material to slide independently into the crystallization reactor 1.

Upstream of add-on socket 4 is a centrifuge 12. In centrifuge 12, the freshly formed crude granules are treated to eliminate their surface moisture and any fines that may be present. The raw polymer material is fed below into centrifuge 12, and the particles are swirled upwards while attaining certain motional impulses and velocities. The still amorphous raw polymer particles are fed into add-on socket 4 through add-on opening 14 which connects the upper section of centrifuge 12 with the beginning of the add-on socket.

In the lowest section of crystallization reactor 1, at the level of the lower mixer/agitator 2, a discharge opening 15 is provided from which the treated and now partially crystalline or semi-crystalline polymer material can be discharged from crystallization reactor 1. During operation, the discharge opening 15 lies below the material level of the agitated particles. Connected to this discharge opening 15 is the beginning of a transfer section 3, 5 through which part of the partially crystalline or semi-crystalline polymer material can be returned into crystallization reactor 1.

The transfer section 3, 5 comprises a conveying means 3 directly connected to the crystallization reactor 1 in the form of a vertical auger 3. This vertical auger 3 rotates at about 100 to 150 revolutions per minute and even in a partially fed state it conveys the partially crystalline or semi-crystalline polymer material leaving the crystallization reactor 1 to a level above the crystallization reactor 1, in the present case to about twice the height of the crystallization reactor 1 level.

In the uppermost area of vertical auger 3, an opening is formed through which the material is fed into a tubular closed material chute 5. The material chute 5 is diagonally inclined at an average incline angle $\beta$ of about 30° to 30° measured at the horizontal. The material chute 5 does not end in the add-on socket 4 straight, but at a certain angle. In this fashion, a re-mixing cycle is formed by which the partially crystalline or semi-crystalline non-sticky granules are admixed to the sticky amorphous crude granules.

The material chute 5 is provided with an upper section 8 close to the conveying means 3 and a lower buckled section 7 close to the add-on socket 4. The buckled section 7 is at an angle to the add-on socket 4 and buckles downward, in the present case at an angle $\alpha$ of about 95°. The buckled section 7 or the middle axis of buckled section 7 is aligned relatively vertical or perpendicular, in the present case at an angle $\zeta$ of about 15° to 20° to the perpendicular.

As FIG. 1 as well as FIG. 3 shows very well, the buckled section 7 and the add-on socket 4 are aligned to each other at an acute angle $\epsilon$ and their middle axes form an angle of about 35°. Thus, the two material streams meet at higher velocities at this acute angle and mix.

FIG. 4 shows the inventive apparatus in top view. It can be recognized that the middle axes of buckled section 7 and add-on socket 4 define or span a plane 9. This vertically aligned plane 9 divides the crystallization reactor 1 into two substantially equal parts. The vertical auger 3 does not lie in this plane 9. Thus, the upper section 8 of the material chute 5 is also aligned at an angle $\gamma$ of about 20° to plane 9. According to an advantageous embodiment, the vertical auger 3 is also arranged at plane 9, or the vertical longitudinal axis of the vertical auger 3 lies in this plane 9.

In the area of the buckle of material chute 5 about angle $\gamma$, there is also a buckle toward the horizontal. In that area, the incline angle $\beta$ is reduced by about 5° to 10°. Thus, the sliding material can change direction in two respects.

FIGS. 2 and 3 show that the material chute 5 becomes wider in downward direction. In the area directly before buckled section 7, the material chute 5 widens conically while remaining substantially at the same level. Furthermore, the cross section of material chute 5 changes just before buckled section 7 from approximately circular to rectangular.

FIGS. 6a and 6b show details about the area of a possible embodiment of add-on socket 4, namely in an overall view and in a lateral sectional view. These show the end section of material chute 5 in which the cross-section changes to rectangular. Connected thereto in flow direction via angle a is the buckled section 7 with its function as a baffle plate. Furthermore, buckled section 7 ends downstream from the top via recess 16 and at an acute angle in the middle section of the inclined add-on socket 4. Here is also where the two material streams of the still amorphous raw polymers and the already partially crystallized particles to be re-mixed are meeting. The add-on socket 4 becomes conically wider in downward direction.

FIG. 7 a, b and c show details of a possible embodiment of the add-on socket 4. FIG. 7 1 shows a frontal view in which for the sake of clarity parts of the upper cover were removed. FIG. 7 b shows an overall view. FIG. 7 c shows a lateral view in which the diagonal incline of the add-on socket 4 at angle δ, in the present case at an angle of about 20°, is shown.

The add-on socket 4 broadens downward in the shape of a fan, and its lower sliding surface has a number of straight grooves 17. These grooves 17 run in flow direction from the centrifuge 12 to the crystallization container 1. The middle groove 17 runs parallel to plane 9, the adjacent grooves 17 to the left and to the right are inclined outwardly in the shape of a fan, which means that the upper edges between the grooves 17 are not running parallel to each other but are diverging slightly.

Each groove 17 has a triangular cross section and two flank faces set at an angle to each other, in which way they form the deeper groove 17 in which the material can slide. In the present embodiment, the two flank faces are at an angle of about 90° to each other.

The height or depth of each groove 17 continuously increases downward to almost 170 to 180% of the height or depth at the upper end of each groove 17. The width of each groove 17 increases to the same extent.

Each groove 17 is therefore straight, inclined downward, and its height or depth and its width increases in downward direction. The raw polymer material, which enters through add-on socket 14, and also the partially crystalline or semi-crystalline material coming from above slides in these grooves 17 and is thus evenly distributed across the entire width of the add-on socket 4, resulting in thorough mixing, and a broad material stream can enter crystallization reactor 1.

Another discharge opening 10 is provided in the vertical auger 3, through which the partially crystalline or semi-crystalline polymer leaves the re-mixing cycle. This discharge opening 10 lies lower than or at the same height as opening 11, in the present case on the opposite side of opening 11. Connected to this is a non-compressing auger 13 with an upward incline. This auger 13 is controllable, and the proportion of discharged polymer can therefore be exactly measured, which means that the rate of re-mixing or the re-mixing ration can also be adjusted with precision. Alternatively the partially crystalline or semi-crystalline material can also be branched off directly from reactor 1 and segregated from the cycle.

Downstream from this auger is a bin 6 for storing and/or further processing of the polymer material. Such bins are known in prior art, and as an example only, this bin 6 may be an Octabin or an SSP reactor.

The inventive procedure is performed with this apparatus as follows:

The procedure begins when a polymer melt conveyed by an extruder (not shown) via a pelletizer is formed in the conventional manner first into strands and, then comminuted into granules. The granules are then dried in centrifuge 12, cleaned to remove dust and fines, and subsequently conveyed through add-on opening 14 into the region of the add-on socket 4. The granules are still hot, and their interior may still be molten. They still possess enough internal heat to effectively support and facilitate drying off any residual moisture without the necessity of external heating. On the other hand, they are cold enough not to deform but to keep their shape. In any event, these mostly still amorphous crude granules have a great tendency to stick together and form a cake, especially when they lie against each other motionless; this is to be prevented, since it makes processing difficult.

In a first step, the mostly amorphous and hot crude granules are now discharged at a certain velocity from centrifuge 12 to the add-on socket 4, from where they slide through the slanted incline of add-on socket 4 into the crystallization reactor 1. There they remain for a certain adjustable dwell time under conditions in which the crystallization rate is greatest, and they are held in particulate form under constant agitation. At the same rime, they are tempered, and—at least in some sections—they form partially crystalline or semi-crystalline components while the crystallization rate increases:

After this first step, the now partially crystalline or semi-crystalline polymer materials are discharged through opening 15 in the lower region of crystallization reactor 1 into the vertical auger 3. From it, they are conveyed upward to a level of about twice the height of crystallization reactor 1. The discharge opening 10 to bin 6 is still closed, which means that in the beginning, the entire partially crystalline or semi-crystalline granulate is re-mixed.

The partially crystalline or semi-crystalline granulate is conveyed through opening 11 into the material chute 5 along which it slides under the force of gravity. Here it achieves a certain velocity and a certain kinetic impulse until it hits the baffle plate or baffle section 18 in the buckled section 7. This brakes the granulate and swirls it around, the granules hit against each other and against the walls, thus attaining different directions and relative velocities. Good distribution is achieved through the braking action of the granules.

The two material streams are then combined in the add-on socket 4. On the one hand, the mostly amorphous crude granulate flows in the add-on socket 4. On the other hand, the partially crystalline or semi-crystalline granules which are baffled by the buckled section 7 fall down from above. In that manner, the two material streams are mixed in a section of add-on socket 4 even before they reach crystallization reactor 1. Due to the design and geometry of the add-on socket 4, a through mixing of the material streams results, and they form no layers. The partially crystalline or semi-crystalline polymer particles, which do not have a tendency to stick, settle homogenously and statistically well distributed between the sticky amorphous particles, and the result is an overall intensive homogenous mix which is fed via the fan-shaped extension of add-on socket 4 into crystallization reactor 1 where it can be moved by the mixer and agitator elements without sticking.

The present process is continuous, and after a certain equilibrium has been established in the procedure, the discharge opening 10 is gradually opened, and the re-mixing ration is reduced. Then the less partially crystalline or semi-crystalline material is branched off and re-mixed, and some of the material is conveyed via the non-compressing auger 13 into the bin 6, in the present case into an Octabin. Of course, any kind of bin can be used instead of an Octabin, such as a silo or an SSP bin. The correct re-mixing ratio or the separation of the finished material from the re-mixing cycle is controlled largely by the r.p.m. of the vertical auger 3 and/or by the r.p.m. of the auger 13 that connects to bin 6. It is also feasible that openings 11 and 10 are opened and closed as required with adjustable slides.

For example, an advantageous equilibrium in the system can be achieved with the following parameters:

Amorphous PET coming from the dryer or from centrifuge 12 is introduced into the add-on socket 4 at a temperature of about 130° C. and at a mass flow rate of 350 kg/h. At the same time, partially crystalline or semi-crystalline PET is conveyed into the add-on socket 4 via material chute 5 at a temperature of about 145° C. and at a mass flow rate of 850 kg/h. In the add-on socket 4, the material is thoroughly mixed after which it is conveyed into crystallization reactor 1.

The following explanations are provided for the better understanding of the invention:

Suitable polymers for such treatment are crystallizable thermoplastic polymers. The polymers are derived from their monomers through a polymerization reaction such as radical, anionic or cationic polymerization, polyaddition or polycondensation. Particularly suitable are crystallizable thermoplastic polycondensates such as polyamide, polyester, polycarbonate, polyhydroxylalkoanates, polylactides or their copolymers.

Polyesters are polymers which are usually derived through polycondensation from their monomers, a diol component and a dicarboxylic acid component. Typical examples of polyester are polyethylene terephthalate (PET), Polybutylene terephthalate (PBT) and polyethylene naphthalate (PEN), which are used either as homopolymers or as copolymers.

Suitable polyethylene terephthalates have an intrinsic viscosity in the region from 0.3 to 1 dl/g, measured with 0.5 g PET in 100 ml of phenol/dichlorobenzene (1:1).

Polyactides (PLA) are polymers which can be derived directly under dehydration from lactic acid or by ring opening polymerization from their cyclic dimers (lactides). The inventive procedure and the inventive apparatus have also proven successful for PLA.

The polymers can be new material or recycled polymers. Recycled polymers are reprocessed polymers from manufacturing and post-industrial processes or polymers that were collected and reprocessed after consumer use (post-consumer polymers).

Polymers can be provided with additives. Examples of suitable additives are catalyzers, artificial colouring agents and pigments, UB blockers, processing aids, stabilizers, impact modifiers, chemical or physical blowing agents, fillers, nucleating agents, flame retardants, softeners, barriers or particles which improve mechanical properties, reinforcing bodies such as globules or fibres, and reactive substances such as oxygen aborbers, acetaldehyde absorbers or substances which increase the molecular weight, etc.

The polymer melt is produced with apparatuses or reactors that are known in prior art. In principle, polymerization reactors are suitable in which polymers are produced in liquid phase, such as stirred tank reactors, cage reactors or disk reactors, or apparatuses in which previously produced polymers are melted, such as extruders or kneaders. Polymer production can be continuous or in batches. However, continuous processes are preferred for further processing. Undesirable substances such as pollutants from recycled products, residual solvents from polymer production as well as monomers, dimers, oligomers or fission products from polymer melt production can be removed via a degassing system such as thin layer evaporators or extruders, especially multiple-screw extruders such as twin-screw extruders or ring extruders. For the processing of a polymer melt, other process steps can be used such as pressure generation, filtration, tempering or mixing.

The particles can be formed from the polymer melt by various means. Clumps, strands or bands formed in the polymer melt can be shredded, or particles can be formed directly, for example by droplet forming or spraying. Most common are processes of granulation, where individual polymer strands are formed from the polymer melt in an outlet means, particularly in a nozzle or nozzle plate. Granules can be formed from polymer strands with granulation procedures known in prior art, such as strand granulation, water ring granulation, underwater granulation or hot face granulation, dripping or spraying. The polymer strands leaving the melt channels are solidified and separated into a multitude of individual granules, whereby the separation can take place before or after solidification.

Although the term "water" is used in the names of some apparatuses, other liquid media can be applied as well. The particles are separated, for example, by independent drop formation, by using a liquid shear medium or by mechanical separation, in particular by cutting. While drops are formed independently of through a shear medium at the nozzle outlet, cutting can be done directly at the nozzle outlet, or only after the material has gone through a treatment step.

The polymer melt is hardened by means of cooling with one or more cooling media or a combination thereof, which could be gaseous (e.g. air, nitrogen or $CO_2$) or liquid (e.g. water or ethylene glycol). If a liquid cooling medium is used, the particles must be subsequently separated from it. This can be done by means of suction, a gas stream, an impact dryer or a centrifugal dryer. The mean particle size should be between 0.5 mm and 10 mm, preferably between 1.5 mm and 5 mm, and in particular between 2 mm and 3.5 mm. The mean particle size is the statistical mean of the particle diameter which results from the average of particle height, length and width. The preferred granular weight lies between 2 and 100 mg, in particular above 5 mg, and preferably above 10 mg and especially below 50 mg, and preferably below 30 mg.

Preferably the particle are to have a defined granular shape, such as cylindrical, spheroidal, drop-shaped, globular or a designed shape as suggested, for example, in EP 541 674 (Yau). Solid particles or porous particles could be used which for example could be produced through sintering, foaming and such.

The cooling of the particles can be done as part of the particle production, or it can be continued after particle production. The same cooling medium as in particle production can be used. But other cooling media can be used as well. Alternatively, cooling arrangements known from prior art can be used as well.

After the polymer particles are formed, the present invention provides for the relevant step of at least partial crystallization in a crystallization reactor. Crystallization can be continuous or in batches. Customarily, crystallization is a thermal process. The required heat can, for example, be obtained via a heated wall of the crystallization reactor, through heated inserts in the crystallization reactor, by means of radiation or blowing-in of a hot process gas, preferably via the internal heat of the particles of flakes.

Crystallization should proceed at a suitable temperature over a suitable dwell time. Advantageously, crystallization should at least result in a degree of crystallization that allows further thermal treatment such as drying or a solid-state polycondensation without leading to sticking or to the formation of lumps.

The suitable temperature range becomes evident when the crystallization half-life, measured by means of DSC, is recorded as a function of temperature.

To prevent the sticking of crystallizing polymer articles, these must be held in motion in relation to each other. This can be accomplished, for example, with an agitator, an agitated bin or by means of a fluidization gas.

Suitable crystallization reactors are vibrating reactors, rotating reactors, reactors with agitators, and reactors which are perfused by a process gas, whereby the flow velocity of the process gas must be such that the polymer articles can be moved. Particularly suitable as crystallization reactors are fluidized-bed or turbulent fluidized-bed crystallizers.

Several other arrangements for producing particles can be connected to a crystallization apparatus. This brings the advantage that in an alternating operation of several arrangements for the production of particles, a constant volume of particles is fed to the crystallization apparatus. Optionally, after the step of raising the crystallization degree, another step follows to provide thermal treatment. For example, this can be a step for drying or moistening and/or a step for solid-state polycondensation (SSP).

Directly after crystallization or subsequently to the further step of thermal treatment, the polymer articles can be cooled down to a temperature that is suitable for storing them. Cooling is provided by a means known in prior art, for example in a plate heat exchanger, a fluidized bed cooler, in conveyors with a surplus of cooling medium, by direct input into a cooling liquid, or by contact with a cold surface. Cooling by air is mainly an advantage with PET or PA, since these materials are hygroscopic.

Later, the polymer articles can be processed to become products such as fibres, ribbons, tubes, films, extrusion blow moulds, injection moulds, or sintered parts. For example, polyethylene terephthalate is largely made into hollow elements such as bottles. The polymer articles can also be processed into products directly after crystallization or subsequent to the further step of thermal treatment.

The invention claimed is:

1. An apparatus for producing partially crystalline or semi-crystalline polymer material from raw polymer material, comprising:
    a crystallization reactor comprising:
        a mixing and agitating tool configured to agitate and keep the polymer material in the crystallization reactor particulate; and
        an add-on socket disposed in an upper region of the crystallization reactor, configured for the raw polymer material to be conveyed therethrough;
    a transfer section connected to the crystallization reactor, configured for at least some of the partially crystalline or semi-crystalline polymer material to be re-mixed in the crystallization reactor;
    wherein the transfer section ends in the add-on socket.

2. The apparatus according to claim 1, wherein the transfer section comprises a conveyor which is connected to the crystallization reactor, wherein the conveyor is configured to convey the at least some of the partially crystalline or semi-crystalline polymer material to a level above the crystallization reactor.

3. The apparatus according to claim 2, wherein the transfer section further comprises a material chute connecting an upper region of the conveyor to the add-on socket.

4. The apparatus according to claim 1, wherein the add-on socket is disposed in an upper edge region of the crystallization reactor.

5. The apparatus according to claim 3, wherein the material chute comprises an upper section near the conveyor and a lower end section near the add-on socket, wherein the lower end section is disposed at an angle with respect to the upper section.

6. The apparatus according to claim 5, wherein a middle axis of the add-on socket forms an acute angle with a middle axis of the lower end section.

7. The apparatus according to claim 5, wherein a middle axis of the lower end section lies at an angle with respect to vertical, wherein the angle is between 0° and 45°.

8. The apparatus according to claim 5, wherein a middle axis of the lower end section and a middle axis of the add-on socket define a plane that divides the crystallization reactor into two substantially equal subsections.

9. The apparatus according to claim 1, wherein the add-on socket flares outward in an end section of the add-on socket near the crystallization reactor (1).

10. The apparatus according to claim 1, wherein the add-on socket comprises a lower sliding surface comprising straight recessed grooves.

11. The apparatus according to claim 3, wherein the conveyor comprises a discharge opening configured to discharge the at least some of the partially crystalline or semi-crystalline polymer material, wherein the discharge opening is at or below a level of an opening connecting the conveyor to the material chute.

12. The apparatus according to claim 1, further comprising a control device configured to control the amount of the at least some of the partially crystalline or semi-crystalline polymer material to be re-mixed in the crystallization reactor.

13. The apparatus according to claim 2, further comprising a bin connected to the conveyor.

14. The apparatus according to claim 1, further comprising a centrifuge configured to remove surface moisture and fines from the raw polymer material, and to feed the raw polymer material into the add-on socket.

* * * * *